United States Patent
Ali et al.

(10) Patent No.: US 8,533,757 B2
(45) Date of Patent: *Sep. 10, 2013

(54) INTELLIGENT SYSTEM AND METHODS OF RECOMMENDING MEDIA CONTENT ITEMS BASED ON USER PREFERENCES

(75) Inventors: Kamal Ali, Campbell, CA (US); Wijnand Van Stam, Sunnyvale, CA (US)

(73) Assignee: TiVo Inc., Alviso, CA (US)

(*) Notice: Subject to any disclaimer, the term of this patent is extended or adjusted under 35 U.S.C. 154(b) by 58 days.

This patent is subject to a terminal disclaimer.

(21) Appl. No.: 13/325,016

(22) Filed: Dec. 13, 2011

(65) Prior Publication Data

US 2012/0084818 A1    Apr. 5, 2012

Related U.S. Application Data

(63) Continuation of application No. 10/168,070, filed as application No. PCT/US00/33876 on Dec. 14, 2000, now Pat. No. 8,079,046.

(60) Provisional application No. 60/171,829, filed on Dec. 21, 1999.

(51) Int. Cl.
*H04N 5/445* (2011.01)
*G06F 3/00* (2006.01)
*G06F 13/00* (2006.01)

(52) U.S. Cl.
USPC .............................................. 725/46; 725/39

(58) Field of Classification Search
None
See application file for complete search history.

(56) References Cited

U.S. PATENT DOCUMENTS

| | | | |
|---|---|---|---|
| 5,410,344 A | 4/1995 | Graves et al. |
| 5,583,763 A | 12/1996 | Atcheson et al. |
| 5,758,257 A | 5/1998 | Herz et al. |
| 5,758,259 A | 5/1998 | Lawler |
| 5,790,935 A | 8/1998 | Payton |
| 5,828,843 A | 10/1998 | Grimm et al. |
| 5,835,087 A | 11/1998 | Herz et al. |
| 5,867,799 A | 2/1999 | Lang et al. |
| 5,973,683 A | 10/1999 | Cragun et al. |
| 5,983,214 A | 11/1999 | Lang et al. |
| 6,005,597 A | 12/1999 | Barrett et al. |
| 6,029,195 A | 2/2000 | Herz |
| 6,061,650 A | 5/2000 | Malkin et al. |

(Continued)

FOREIGN PATENT DOCUMENTS

| | | |
|---|---|---|
| EP | 0854645 | 7/1998 |
| JP | 1996-12823 | 5/1996 |

(Continued)

OTHER PUBLICATIONS

Beerud Dilip Sheth, "A Learning Approach to Personalized Information Filtering", Jan. 14, 1994.

(Continued)

*Primary Examiner* — Chris Parry
*Assistant Examiner* — Omar S Parra
(74) *Attorney, Agent, or Firm* — Hickman Palermo Truong Becker Bingham Wong LLP; Kirk D. Wong

(57) ABSTRACT

A system and method for making program recommendations to users of a network-based video recording system utilizes expressed preferences as inputs to collaborative filtering and Bayesian predictive algorithms to rate television programs using a graphical rating system. The predictive algorithms are adaptive, improving in accuracy as more programs are rated.

51 Claims, 6 Drawing Sheets

(56) References Cited

U.S. PATENT DOCUMENTS

| | | |
|---|---|---|
| 6,088,722 A | 7/2000 | Herz et al. |
| 6,092,049 A | 7/2000 | Chislenko et al. |
| 6,177,931 B1 | 1/2001 | Alexander et al. |
| 6,249,785 B1 | 6/2001 | Paepke |
| 6,266,649 B1 | 7/2001 | Linden et al. |
| 6,317,881 B1 | 11/2001 | Shah-Nazaroff et al. |
| 6,438,579 B1 | 8/2002 | Hosken |
| 6,457,010 B1 | 9/2002 | Eldering et al. |
| 6,460,036 B1 | 10/2002 | Herz |
| 6,526,577 B1 | 2/2003 | Knudson et al. |
| 6,532,241 B1 | 3/2003 | Ferguson et al. |
| 6,606,624 B1 | 8/2003 | Goldberg |
| 6,642,939 B1 | 11/2003 | Vallone et al. |
| 6,675,205 B2 | 1/2004 | Meadway et al. |
| 7,065,709 B2 | 6/2006 | Ellis et al. |
| 7,146,627 B1 | 12/2006 | Ismail et al. |
| 7,840,986 B2 | 11/2010 | Ali et al. |
| 2002/0199194 A1 | 12/2002 | Ali et al. |
| 2003/0110503 A1 | 6/2003 | Perkes |
| 2004/0117831 A1 | 6/2004 | Ellis et al. |
| 2005/0027810 A1 | 2/2005 | Donovan |
| 2005/0262542 A1 | 11/2005 | DeWeese et al. |
| 2006/0150216 A1 | 7/2006 | Herz et al. |
| 2006/0190966 A1 | 8/2006 | McKissick et al. |
| 2006/0195362 A1 | 8/2006 | Jacobi et al. |
| 2011/0061076 A1 | 3/2011 | Ali et al. |
| 2012/0213494 A1 | 8/2012 | Barton et al. |

FOREIGN PATENT DOCUMENTS

| | | |
|---|---|---|
| JP | 1998-512420 | 11/1998 |
| JP | 1998-336590 | 12/1998 |
| WO | WO 99/35830 | 7/1999 |
| WO | WO 99/38321 | 7/1999 |

OTHER PUBLICATIONS

Mark Caro, "Gene Siskel: A Man of Influence", Feb. 22, 1999.

Metabyte, "Metabyte Announces Personalized TV Software", Metabyte Networks, Inc., Press Release, XP-002154116, written Jan. 21, 1999, 1 page.

TIVO, "TIVO Brings Home HBO Through Agreement Benefiting Personal Television Service Users", press release, XP-002154115, written Jan. 28, 1999, 2 pages.

Resnick, Paul, et al., "GroupLens: An Open Architecture for Collaborative Filtering of Netnews", press release, XP-000601284, 1994, pp. 175-186.

Japanese Patent Office, "Official Notice for Preliminary Rejections (English translation)", Japan app. No. 2001-547844, dated Apr. 16, 2010, 3 pages.

INTELLIGENT SYSTEM AND METHODS OF RECOMMENDING MEDIA CONTENT ITEMS BASED ON USER PREFERENCES

CROSS-REFERENCE TO RELATED APPLICATIONS; BENEFIT CLAIM

This application claims the benefit as a Continuation of application Ser. No. 10/168,070, filed Jun. 14, 2002 now U.S. Pat. No. 8,079,046, which is a 371 National Stage Application claiming priority to International Patent Application No. PCT/US00/33876, filed Dec. 14, 2000, which claims priority to Provisional Application No. 60/171,829, filed Dec. 21, 1999, the entire contents of all forementioned are hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Field of the Invention

The present invention relates to automated systems and methods for recommending items to users. More particularly, the invention relates to an adaptive network-based system and methods for predicting ratings for items of media content according to how likely they are to appeal to a user. The invention integrates multiple prediction algorithms and provides heuristics for selecting the most suitable algorithm for making a prediction for any single item, creating a suggestion and rating system having exceptional robustness and predictive accuracy.

2. Description of the Prior Art

The prior art provides various systems for filtering, suggesting and rating. Filtering, suggesting and rating, while they may employ similar methods, constitute separate challenges. In the presence of a large amount of content, be it merchandise, or videos, or newsgroup articles, filtration systems aim to limit the amount of content a user deals with, by presenting only that content that correlates most closely with the users preferences. As such, their essential function is one of exclusion. Suggestion systems aim to direct a user's attention to items they may not have been aware of that are likely to appeal to them, based on their preferences. Thus, their essential function is one of inclusion. Rating systems assign ratings to content items, according to a user's expressed preferences. Hence, their essential function is one of ordering. Occasionally, systems are provided that are capable of performing more than one of the essential functions of excluding, including and ordering.

Some of the prior art examples are adaptive in nature; that is, they are capable of accommodating themselves to changing conditions, in a process that is analogous to learning. For example, over time, a user's preferences may change, sometimes gradually, and sometimes abruptly. Adaptive systems have the capacity to adapt to a user's changing preferences without any explicit input from the user. Often, adaptive systems must be taught, that is, their engines must be initialized with starting values. The teaching process usually consists of the user explicitly indicating their preferences. After being taught, adaptive systems make inferences by monitoring various implicit indicators or the user's preferences.

H. Strubbe, System and method for automatically correlating user preferences with a T.V. program information database, U.S. Pat. No. 5,223,924 (Jun. 29, 1993) and H. Strubbe, System and method for finding a movie of interest in a large movie database, U.S. Pat. No. 5,483,278 (Jan. 9, 1996) provide systems for rating movies and television programs by a user and correlating program information for unrated programs with the user's ratings, so that a program database customized to the user may be created. To rate the programs, the user accesses program information either by time slot or channel, and assigns a Boolean rating of "like" or "dislike." A free-text search algorithm searches a text summary in the program information records rated by the user. The significant words of the text summary are tallied and weighted. A free-text search of unrated records is performed, and a retrieval values is computed. Records with retrieval values are judged to be programs likely to appeal to the user and are added to the database of preferred programs. While the described systems effectively allow the user to filter television programming and movies, it would be desirable to provide a scalar rating system, in which the user is able to express degrees of preference rather than a simple 'yes' or 'no.' Since free-text searches are computationally expensive, it would be advantageous to provide a more efficient, content-based algorithm. It would also be desirable to provide different types or predictive algorithms, thereby increasing prediction accuracy. In addition to assigning overall ratings to programs, it would be a great advantage to provide the user with the capability of rating individual program features, such as the actors or the director.

F. Herz, J. Eisner, L. Ungar, M. Marcus, System for generation of user profiles for a system for customized electronic identification of desirable objects, U.S. Pat. No. 5,754,939 (May 19, 1998) describes a client server-based system for retrieving items of interest to a user. An interest summary of the user is prepared, by querying the user about their interests. Each target item available over the network is described by a target profile. Target profiles are compared to each other and clustered according to similarity. Clusters and individual target items are compared with the user interest summary. Items likely to be of interest to the user are presented in a ranked listing. The user profile is stored on a proxy server, and security measures are provided to safeguard the user's identity. Relevance feedback is provided by monitoring which items a user expresses interest in. While efforts are made to preserve the user's confidentiality through various security measures, it would be desirable to provide a system in which the user's profile is stored locally, on the client side, and communication between the server and the client is stateless, so that the server is completely ignorant of the user's identity. It would also be desirable to provide a prediction engine on the client side, again rendering a stateful connection between client and server unnecessary. In addition to implicit relevance feedback, it would be an advantage to allow the user to correct their profile, thus allowing even greater predictive accuracy.

G. Graves, B. O'Conner, A. Barker, Apparatus and method of selecting video programs based on viewer's preferences, U.S. Pat. No. 5,410,344 (Apr. 25, 1995) describe a method for selecting television programs according to expressed viewer preferences that employs an adaptive prediction algorithm. Television programs are described in terms of attributes. A viewer explicitly rates different attribute-value pairs, also known as features. Based on these explicit viewer ratings, a neural network rates television programs. Programs with a high enough score are automatically recorded for viewing at a later time. The described method, however, must use explicit ratings, it does not employ or generate implicit ratings. Furthermore, the described method provides only a single prediction algorithm, limiting its versatility and robustness.

J. Hey, System and method for recommending items, U.S. Pat. No. 4,996,642 (Feb. 26, 1991). Employs a conventional collaborative filtering algorithm to recommend movies to a customer from the inventory in a video store. The customer uses a scalar rating system to rate movies they have viewed. The resulting profile is paired with profiles of other customers who have rated at least a portion of those selections rated by the first customer, and an agreement scalar is computed for each of the pairings. Based on these pairings, a group of recommending customers is defined for the first customer. D. Payton, Virtual on-demand digital information delivery system and method, U.S. Pat. No. 5,790,935 (Aug. 4, 1998) describes a digital information system that delivers virtual on-demand information over digital transport systems. A collaborative filtering algorithm predicts content items that might be of interest to each subscriber. A. Chislenko, Y. Lashkari, D. Tiu, M. Metral, J. McNulty, Method and apparatus for efficiently recommending items using automated collaborative filtering and feature-guided automated collaborative filtering, U.S. Pat. No. 6,092,049 (Jul. 18, 2000) describe a method for recommending items to users using automated collaborative filtering. As with the other references described, a conventional collaborative filtering implementation, in which users are correlated to other users, is provided. B. Miller, J. Konstan, J. Riedl, System, method and article of manufacture for utilizing implicit ratings in collaborative filters, U.S. Pat. No. 6,108,493 (Aug. 22, 2000) describe a prediction information system utilizing collaborative filters. Unlike most collaborative filtering implementations, which operate on explicit ratings, the described system utilizes implicit measures. The accuracy of prediction attainable with collaborative filtering has been shown to be quite high. Nevertheless, conventional collaborative filtering implementations all require maintaining user information in a central place, such as on a server, leading to concerns about the user's privacy. Subsequently, similarities between pairs of users are computed on the server. It would be desirable to provide a collaborative filtering implementation based on similarity between pairs of items, rendering it unnecessary to maintain user information on a server, and eliminating the necessity of exchanging state information between client and server.

D. Whiteis, System and method for recommending items to a user, U.S. Pat. No. 5,749,081 (May 5, 1998) describes a system for recommending items of merchandise to a customer at the point of sale based on items already selected. Unlike the collaborative filtering implementations described above, the Whiteis system correlates items, rather than users, by tracking the number of times a pair of items occurs together in the same purchase. Based on the number of times a pair occurs, an adjusted weight is calculated that is taken to be an index of similarity between the two items of the pair. The described system is simple and easily implemented and is well suited for point-of-sale use. However, since similarity is calculated simply on whether a pair occurred in the same purchase, it can only be a very general approximation of similarity. For example, in a video store, a father may be select "Lion King" for his children and "Body Heat" for he and his wife. In the present system, that purchase would be listed as a correlating pair, albeit a weakly correlating pair if it did not occur frequently in the total population of pairs. Furthermore, it would be an advantage to filter the weights to eliminate pairs that correlate weakly. It would also be an advantage to provide information about pairs that anti-correlate.

A. Lang, D Kosak, Information system and method for filtering a massive flow of information entities to meet user information classification needs, U.S. Pat. No. 5,867,799 (Feb. 2, 1999) provide an apparatus, method and computer program product for information filtering in a computer system receiving a data stream from a computer network. Several layers of adaptive filtering are provided, both content-based and collaborative, to ensure that a receiver receives only those content items that correlate very highly with their preferences. There are individual user filters and community filters. The essential function of the system according to Lang, et al is overwhelmingly one of exclusion, with the multiplicity of filter layers. However in a system, the aim of which is to predict items most likely to appeal to a user, and suggest items likely to appeal to a user, the redundant filtering of the present system would limit the amount of content available to the user, thus limiting user choices rather than providing new and unexpected alternatives.

Thus, there exists a need in the art for a system for predicting a rating for an item according to how much it will appeal to a user. It would be advantageous to provide multiple prediction engines that are capable of providing the most accurate prediction for any particular item. It would be highly desirable to provide a convenient user interface for teaching the system the user's preferences. Furthermore, it would be an advantage for the system to have an adaptive capability, so that it can learn and adapt to shifts in user preferences. It would be desirable to provide a distributed collaborative filtering engine that guaranteed a user's privacy by eliminating the necessity of correlating the user to other user's or groups of users. It would be a great advantage to calculate similarity between items, rather than between users and to perform such calculation on the client side, eliminating the necessity of a stateful connection between the server and the client. It would be a significant technological advance to provide an adaptive modeling prediction engine that accepted both explicit user ratings and had the capability of inferring user ratings in the absence of explicit ratings. It would be a great convenience to display the output of the various prediction engines in a single, integrated list.

SUMMARY OF THE INVENTION

The invention provides a network-based intelligent system and method for predicting rating for items of media content according to how likely they are to appeal to a user based on the user's own earlier ratings. Collaborative filtering and content-based prediction algorithms are integrated into a single, network-based system. System heuristics determine which of the provided algorithms provide the most reliable predictor for any single new content item.

In a preferred embodiment of the invention, a network-based video recording system rates television programs according to the likelihood that they will appeal to a user, based on the user's own previous ratings of television programming. Individual recording units, clients, are in intermittent communication with a server. A user interface is provided in which the user teaches the system by recording their programming preferences. Using an interactive rating system that employs a "thumbs up" and "thumbs down" metaphor for favorable and unfavorable ratings, respectively, individual users may give an overall rating to a program, or they may rate individual features of the program: for example, directors, actors, and genres; provided in interactive lists. The users preferences are then used as inputs to one or more predictive algorithms.

A collaborative filtering algorithm is provided, in which individual items are correlated to each other, instead of the usual approach of correlating users to each other. Lists of rated items are periodically uploaded from individual clients to the server. The ratings are extracted from the lists and stored in matrices on the server, eliminating the necessity of keeping client state information on the server, thus advantageously providing an important privacy safeguard. The server computes correlation factors for pairs of programs and provides them to the client in a correlating items table. The client searches the table for pairs containing programs already rated by the user. Thus, other programs not rated by the user, which correlate to the rated program, can be assigned a similar rating.

In the absence of up-to-date correlating items data, an adaptive modeling algorithm is also provided that works by using content-based filtering: in particular it uses the features of a program and a user's prior preferences on those features to arrive at a prediction of how much the user would like a program. In the absence of explicit ratings of a program's features, a modified naïve Bayes algorithm infers ratings of the program features based on previous ratings by the user of programs containing at least one of the features. Based on the inferred feature ratings, a prediction is made of how much the user would like the program. Unlike conventional implementations of the naïve Bayes algorithm, the invention extends the Bayes algorithm to handle multi-valued features, i.e. a program generally has more than one actor, or it may be classified in more than one genre. Additionally, the invention provides for the integration of explicit advice, the expressed user preferences, with inferred ratings.

The user is also provided with the capability of correcting preferences, either explicit ones or inferred ones. Thus, the user may optimize the preference profile in order to obtain predictions that coincide with their expectations more closely.

DETAILED DESCRIPTION OF THE INVENTION

Figure 1:
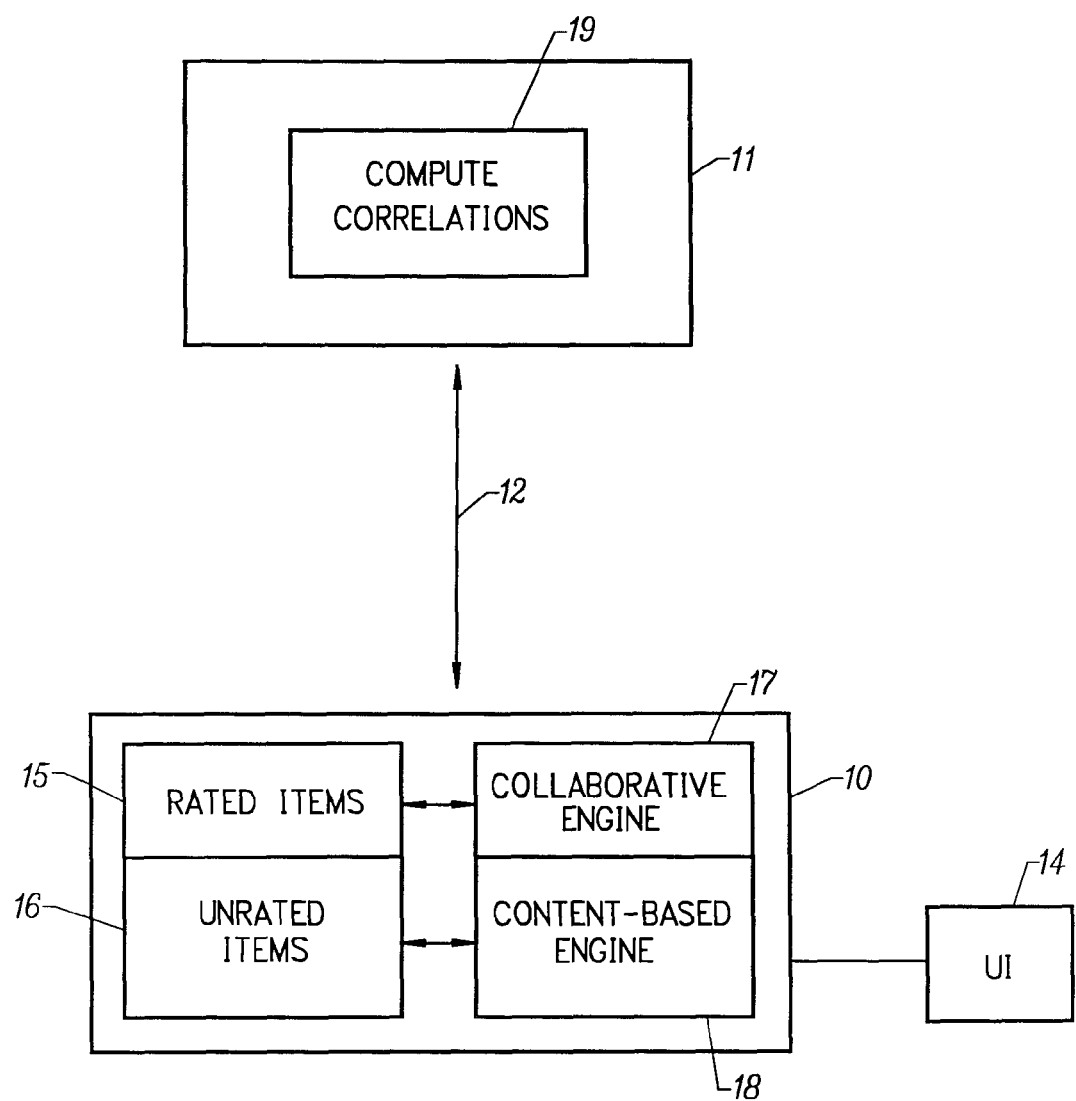
FIG. 1 provides a block diagram of the functional architecture of a network based system for predicting the likelihood that a an item of media content will appeal to a user based on previous ratings of content items by the user, according to the invention.

Referring now to FIG. 1, shown is a block diagram of an intelligent, distributed system for recommending items of media content to a user, based on the user's expressed preferences. Although FIG. 1 illustrates a single client, such illustration is understood to be exemplary only. One skilled in the art will readily appreciate that the system includes a plurality of clients. A client 10, over a conventional network connection 12, is in intermittent communication with a server. A user interface 14 is provided, wherein the user teaches the system the user's preferences concerning programs, categories of programs and program features. When the system has built a sufficient knowledge base, a series of prediction engines having an adaptive capability, predicts ratings for unrated program items, based on the user's expressed preferences. The preferred method employs a novel, client-side collaborative filtering engine 17. Lists of items rated by the user 15 are transmitted to the server 11, where they are aggregated, with the rated items information from many other users, into a single list. A listing of correlating items is generated 19 and transmitted back to the client 10, where the collaborative filtering engine predicts ratings based on the correlation provided by the server, and the user's previous ratings.

It may happen that up-to-date correlation information is unavailable. In such event, an adaptive, content-based prediction engine 18 predicts ratings of unrated program items. Preferably, the content-based engine employs explicit user ratings of various program features as inputs. However, in the absence of explicit ratings, a naïve Bayes classifier infers ratings from which a rating is predicted.

The invention is created and implemented using conventional programming methods well-known to those skilled in the arts of computer programming and software engineering.

Method of Teaching by Users

Figure 2:
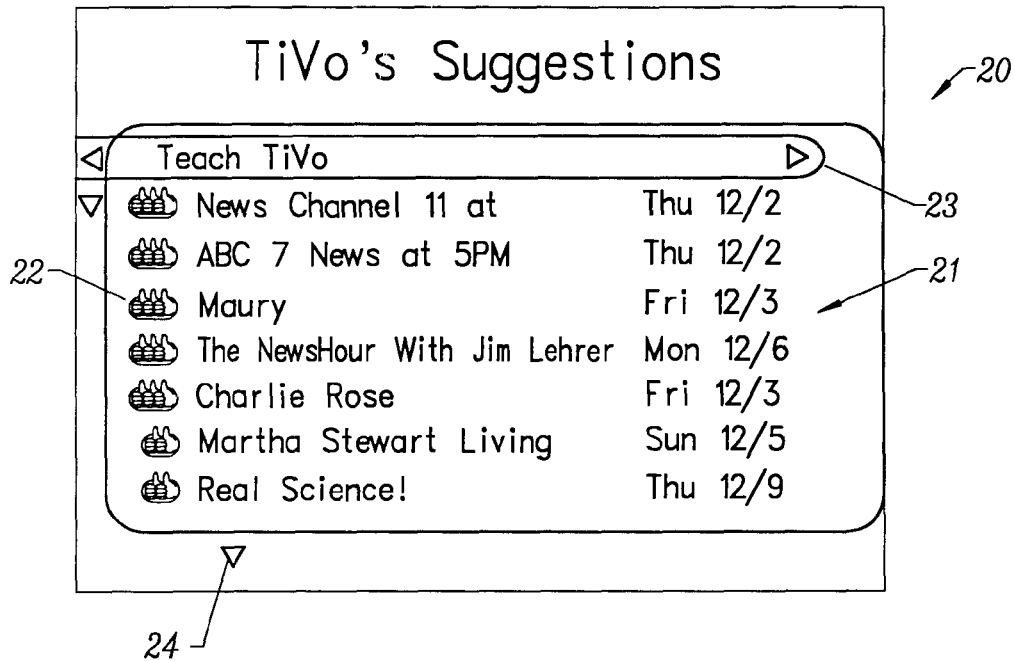
FIG. 2 shows a screen from a user interface to the system of FIG. 1, wherein suggested items are displayed to a user, and access is gained to a user interface, wherein a user teaches the system the user's preferences, according to the invention.
Figure 3:
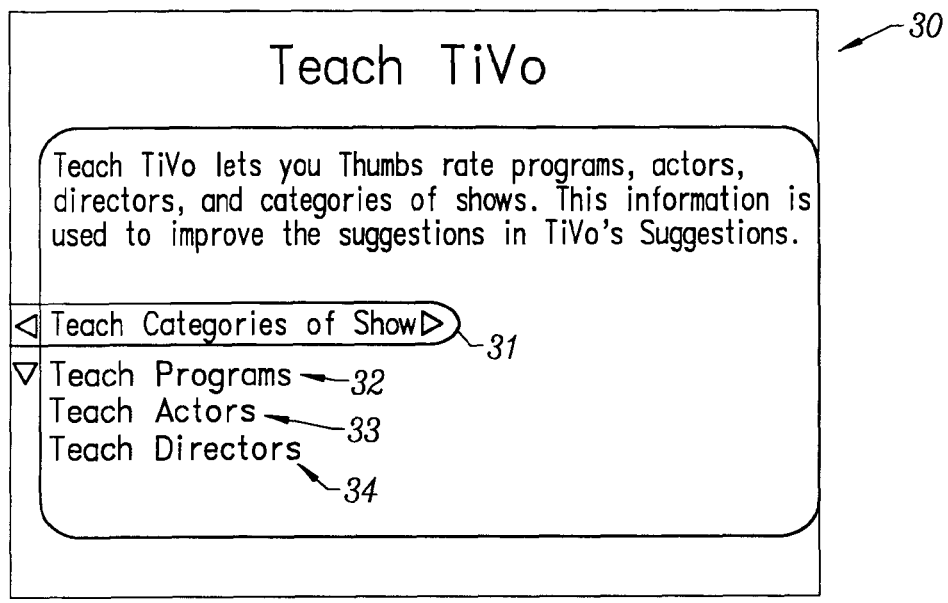
FIG. 3 shows a top-level screen of the teaching interface of FIG. 2, according to the invention.
Figure 4:
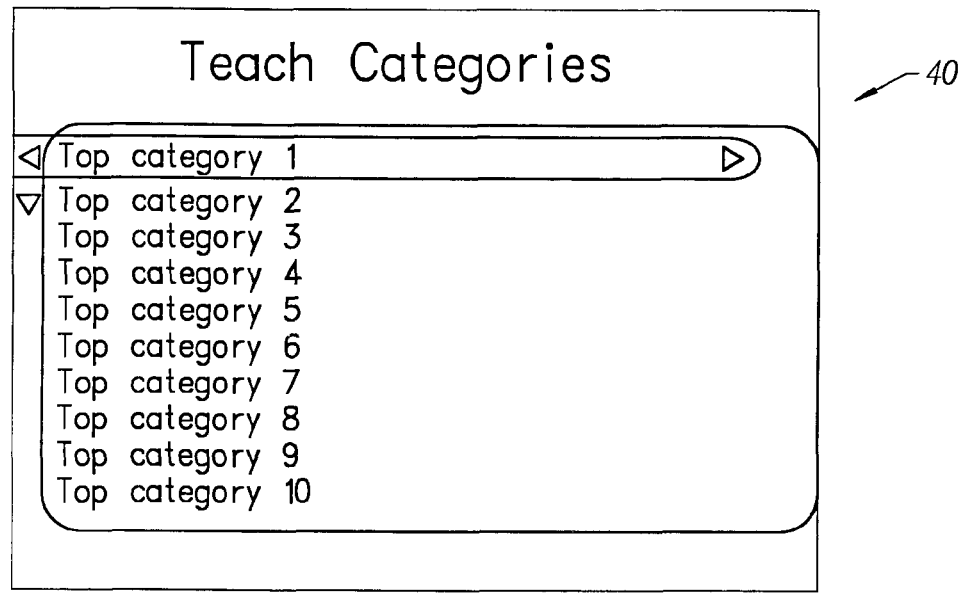
FIGS. 4 and 5 show screens from the teaching interface of FIG. 2 for teaching content category and sub-category preferences, according to the invention.
Figure 5:
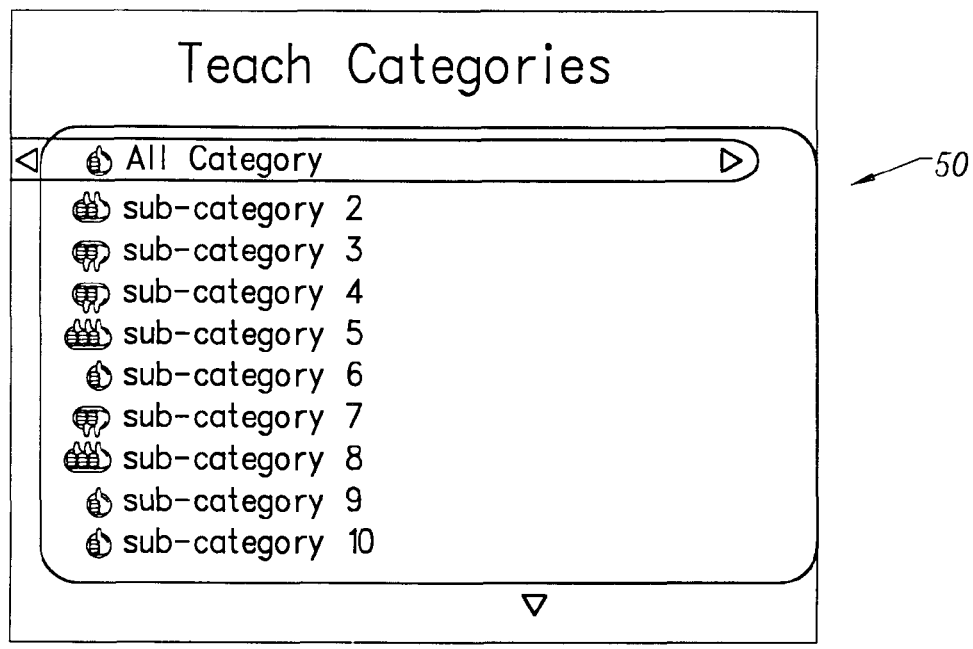
Figure 6:
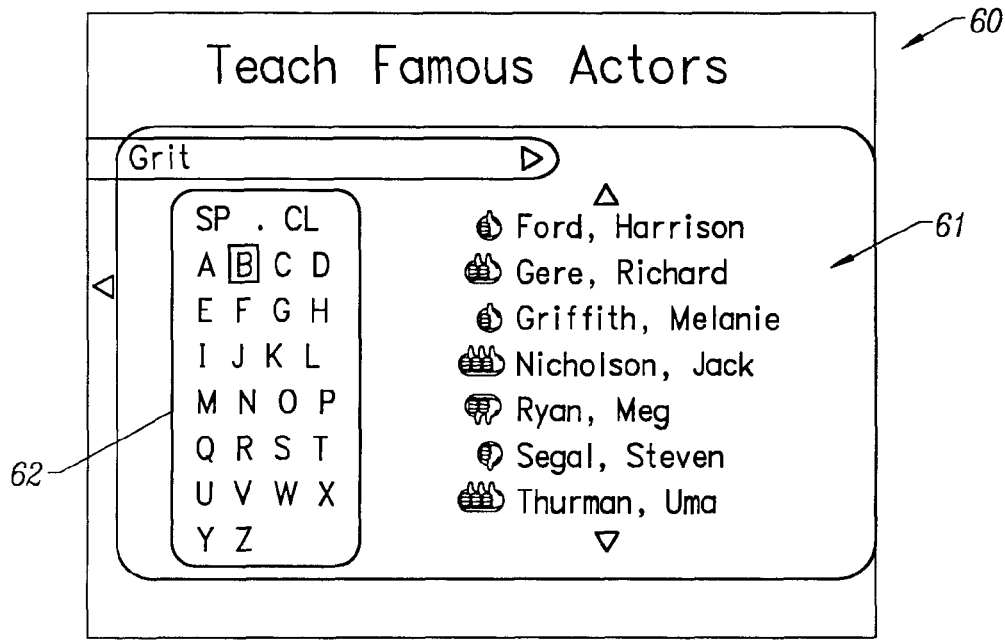
FIG. 6 shows a screen from the teaching interface of FIG. 2 for teaching actor preferences, according to the invention.
Figure 7:
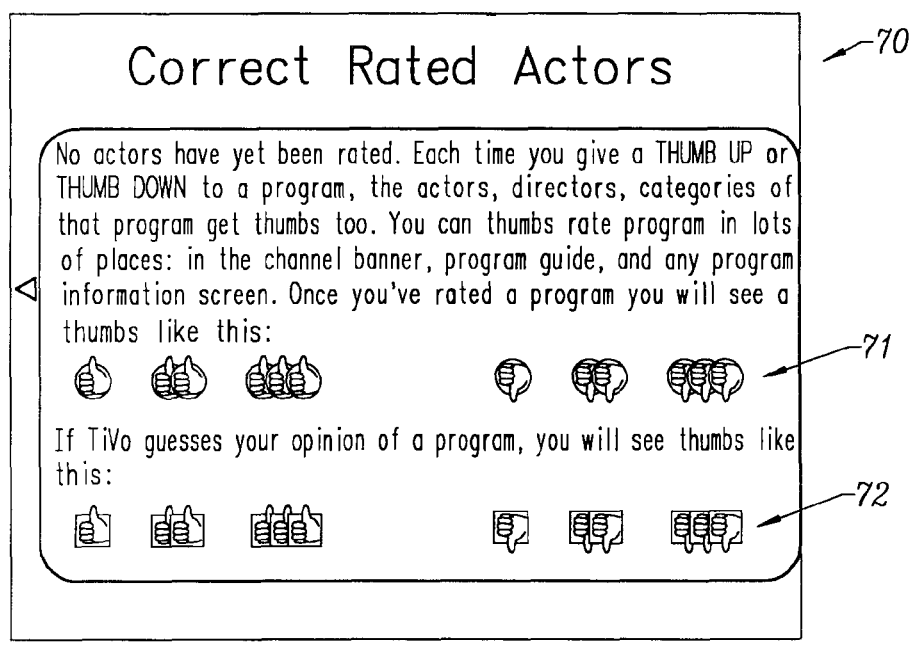
FIG. 7 shows a screen from the teaching interface of FIG. 2 for correcting user ratings and predicted ratings of actors, according to the invention.

The invented system allows users to rate an item, from −3 to 3 (7 levels), wherein negative ratings are unfavorable and positive ratings are favorable. Ratings are expressed using a graphical metaphor, in which "thumbs up" indicate favorable ratings and "thumbs down" indicate unfavorable ratings. 0, indicated by an absence of thumbs, is a neutral rating. Typically, the user assigns thumbs to a program or a program feature by depressing a button on a remote control that is provided with the client unit. Referring to FIG. 2, a suggestion screen 20 of the invented system displays a listing of suggested programs 21 accompanied by their rating icons 22. Close to the top of the screen, beneath the banner, a selection bar is positioned over a menu item 23 that grants access to the teaching screens. The suggestions 21 are displayed in a descending sort according to the number of thumbs 22. An arrow-shaped cursor 24 allows the user to scroll through the entire list of suggestions. Referring now to FIG. 3, the first screen 30 of a user interface for assigning ratings to television programs and individual program features is shown. Selections for rating program category 31 or genre, individual programs 32, actors 33 and directors 34 are provided. The user manipulates the various interface elements by means of the provided remote control. As FIGS. 4 and 5 show, selecting the 'teach category' option 31, navigates the user to a 'teach category' screen 40 and subsequently to a 'teach sub-categories' screen 50. Selecting any one of the displayed categories or sub-categories allows the user to assign 'thumbs' ratings to the selected categories, although the display is not immediately redrawn to reflect the user's ratings. Upon selecting the 'teach actors' option 33, the user is presented with several further options, two of which are shown in FIGS. 6 and 7. As previously indicated, the user's preferences, expressed as ratings, are necessary as input to the various predictive algorithms of the invention. Before the algorithms are able to start providing the user with predictive ratings, they must be "taught" or initialized with a minimum amount of user preference data. In the course of viewing or selecting a program for recording, viewers may assign a rating to a program. By assigning ratings in this way, however it can take a fairly long time before the preference database has accumulated enough data to teach the predictive algorithms. In order to accelerate the process of accumulating preference data, the various teaching screens with their lists are provided, so that the user may initially go through the lists and systematically rate a threshold number of programs and individual features. To facilitate the process of working through the feature list, lists of varying lengths are provided. For example a 'Teach famous actors' screen 60 provides a compact list 61 of high-profile actors. Thus, the process of rating actors, by the user is greatly facilitated. Additionally, a 'Teach all actors' screen (not shown) provides a comprehensive list of actors from which the user may also work. FIG. 6 also shows the manner of assigning ratings. The user is provided with a menu of possible ratings 62 from which they select a rating for the corresponding actor. After selecting the rating, the selected rating is highlighted. As previously described, the user interface is not immediately repainted to reflect the user's rating selection.

Figure 8:
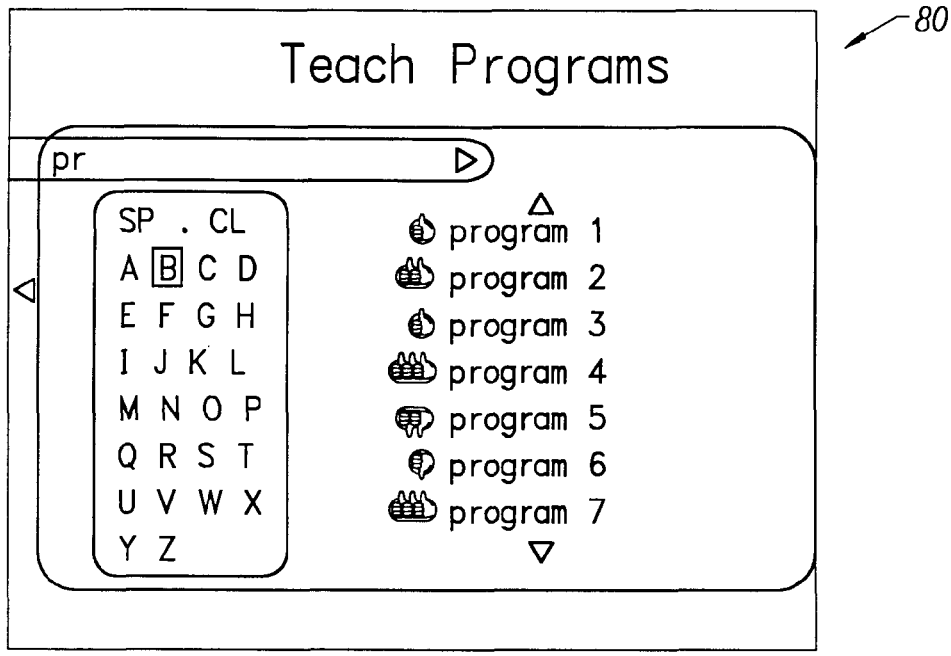
FIG. 8 shows a screen from the teaching interface of FIG. 2 for teaching program preferences, according to the invention.
Figure 9:
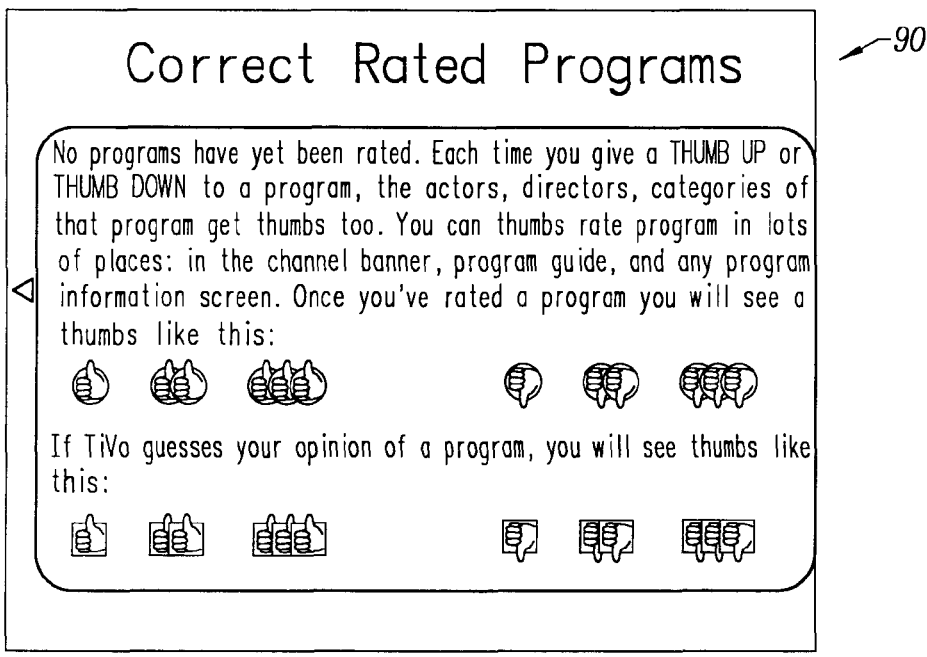
FIG. 9 shows a screen from the teaching interface of FIG. 2 for correcting user ratings and predicted ratings of programs, according to the invention.

In FIG. 7, a 'Correct rated actors' screen 70 is shown. While the example shown indicates that no actors have yet been rated, if actors had been rated, the user would be presented with a list of rated actors, similar to lists already shown. As will be described in greater detail further below, provision is made for distinguishing between user-assigned ratings and predicted ratings assigned by the system. Separate, similar, but distinct icons are provided for user ratings 71 and predicted ratings 72. In the event that actors had been rated, the user would be provided with a single, aggregate list of all rated actors, both user-rated, and those for whom the system has predicted ratings. Thus, the user may correct their own ratings, and they may revise predicted ratings. Advantageously, the ability to view and correct predicted ratings allows the user to browse the basis features that were used by the system to make a particular prediction for a show. This will allow the user to directly modify his or her preference profile in order to obtain predictions more in line with what he or she expected. As FIGS. 8 and 9 show, the process of rating programs and correcting rated programs is almost identical to that for actors.

While screens are not shown for all attributes, the process of rating attributes and correcting them is virtually identical across the entire selection of attributes. The preferred embodiment of the invention provides 'actors,' 'genre' and 'directors' as program attributes. However, the list of attributes need not be so limited. The manner of providing the user interface employs conventional techniques of computer programming and graphics display commonly known to those skilled in the arts of computer programming, software engineering, and user interface design.

As described above, as a preference profile is built, the user may explicitly rate programs and individual programs, and he or she may correct ratings, either their own, or predicted ratings. Additionally, other system heuristics may apply a rating to an item. For example, when a user selects a program to be recorded, the system automatically assigns one thumb up, corresponding to a rating of one, to that item if the user had not already rated the program. Other heuristics are based on whether a program was watched after it was recorded, and for how long.

Predicting Program Ratings

As previously described, the user teaches the system his or her preferences by assigning overall ratings to programs they are familiar with, and rating individual program elements, such as actors and genres. Subsequently, the preferences are fed to one or more predictive algorithms to assign ratings to programs that predict the likelihood of the user liking them. The preferred embodiment of the invention includes a collaborative filtering algorithm and a content-based adaptive modeling algorithm.

The total number of programs available to the user may be considered to be a pool, or a population of items. As previously described, the user assigns ratings to a subset of that pool using discrete ratings. In the preferred embodiment of the invention, the rating is measured as a number of thumbs from −3 to 3, with 0 connoting a neutral rating. There also exists a pool or population of program elements, or features, a portion of which have been rated by the user according to the same rating system.

Collaborative Filtering

The purpose of collaborative filtering is to use preferences expressed by other users/viewers in order to make better predictions for the kinds of programs a viewer may like. In order to rate how much the current user will like a program to be rated, "Friends," for example, the collaborative algorithm evaluates the other programs that the user has rated, for example, two thumbs up for "Frasier," and uses the correlating items table downloaded from the server to make a prediction for "Friends." The correlating items table may indicate that "Friends" and "Frasier" are sixty-six percent correlated and "Friends" and "Seinfeld" are thirty-three percent correlated. Assuming that the user has expressed 2 thumbs up for "Frasier" and 1 thumb up for "Seinfeld," the algorithm will predict 1.6 thumbs up for "Friends," closer to 2 thumbs up than 1 thumb up. This prediction will be rounded to 2 thumbs up in the user interface, and thus the prediction is that the user will like "Friends" to the extent of 2 thumbs up.

The invented implementation of collaborative filtering provides the following advantages:

1. No person-to-person correlation.
    The server 11, which collects "anonymized" preferences profiles from the individual clients, does not as is conventionally done, compute a correlation between pairs of users. Instead, it computes a correlation between pairs of programs. Thus, no sensitive or personal user information is ever kept or needed on the server. Preferences information is http posted from the client to the server; once the network connection is terminated, the server has an anonymous set of preferences—it doesn't matter whose preferences they are. In order to guarantee the user anonymity, the entire preference database of each client is periodically uploaded to the server. Thus there is no need to issue cookies or maintain any client state information on the server.
2. Distributed, or local computation of program ratings.
    Pairs of programs are evaluated that:
        are sufficiently highly correlated to be good predictors of each other, and
        that have been rated by enough viewers.
    The server then transmits to each client the correlations for each significant program pair in a correlating items table. Next, the client filters these pairs to find only those pairs for which one of the programs in the pair has been rated by the user. Thus, continuing with the example above, the server may have calculated a high correlation between "Spin City" and "Friends," based on the preferences information from thousands of other users. However, since the user at hand has rated neither "Spin City" nor "Friends," that correlation is not useful, therefore the client will filter that pair. On the other hand, since the user has rated "Frasier" and "Seinfeld," the pairs [Frasier->Friends 0.66] and [Seinfeld->Friends 0.33] are retained and used as inputs to the collaborative filtering algorithm.

3. The architecture of the collaborative filtering server is highly parallellizable and consists of stages that pre-filter shows and pairs of shows so that computing correlation, a computationally expensive process, for all pairs may be avoided.

4. Carouselling of correlations from server to clients.

The tables of correlating items are broadcast daily, but since correlations between pairs do not change drastically from day to day, each client only processes correlations periodically, eliminating the necessity of recomputing correlations on a daily basis.

5. Robustness of collaborative filtering engine.

Each stage of the collaborative filtering engine may be implemented by several computers. Thus, if one computer is non-functional for a short period of time, correlation computations allocated to that computer will queue up at its feeder computer, and the process is delayed somewhat without a noticeable disruption of service to the user. Additionally, since correlations do not change greatly from month to month, losing a portion of the correlations only results in a graceful degradation of prediction quality, and not a catastrophic loss in quality.

Figure 10:
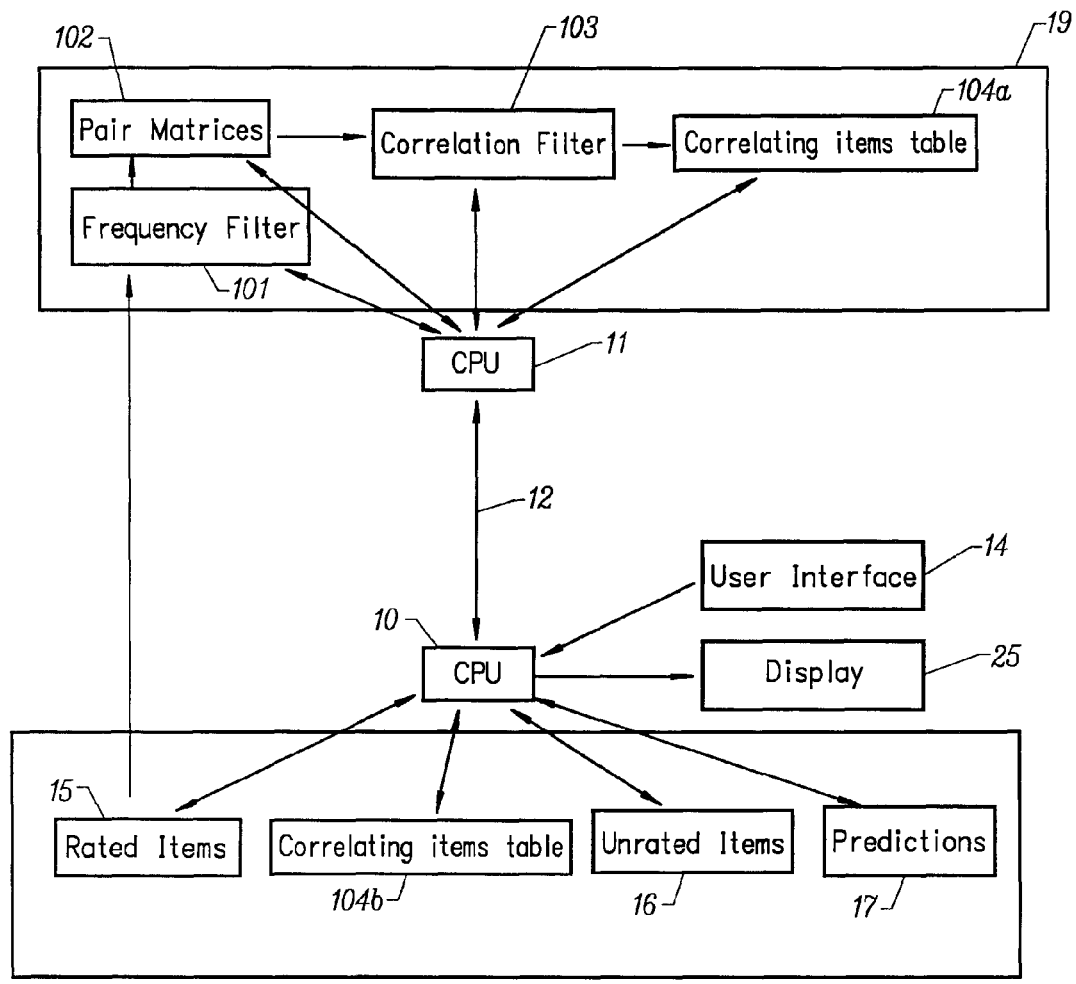
FIG. 10 shows the block diagram of a distributed system collaborative filtering prediction system, within the system of FIG. 1, according to the invention.

FIG. 10 provides a diagram of the functional architecture of a distributed collaborative filtering engine, according to the invention. A client 10 is in intermittent contact with a server 11 over a network connection 12. As indicated above, the server-side architecture may be implemented across several computers, or it may be implemented on a single computer having multiple functional units. In the preferred embodiment of the invention, the network connection is either a dial-up connection over publicly available telecommunications networks or a satellite connection. However, other types of network connections known to those skilled in the art are within the spirit and scope of the invention. According to the preferred embodiment of the invention, the client 10 and the server 11 are in communication for a brief period on a daily basis so that the client may transmit rated items 15 to the server 11 and receive the correlating items table 104b broadcast from the server 11 periodically. A listing of unrated items 16, wherein the unrated items consist of television programs, is resident on the client 10. The list of unrated programs is presented to the user on a conventional display means 25. The display means may be a television screen, A CRT monitor, an LCD display, or any other generally known display means. During the period of daily contact with the server, the list of unrated items 16 is updated. An interactive user interface 14, allows the user to rate items known to the user using the graphical rating system previously described. As items are rated by the user, the rated items are saved to a listing of rated items 15. In the preferred embodiment of the invention, the listing of rated items 15 exists as a conventional table. However, other commonly known data structures, such as delimited text files, would be equally suitable.

When the client 10 and the server 11 are in communication, the list of rated items 15 is transmitted to the server. The correlating items table 104a is generated using the rated items 16 input of all users, or a random sample of them. A frequency filter 101 blocks items and pairs of items that have not been rated by a sufficient number of users, thus minimizing the storage required for the pair matrices 102. The filter thresholds also serve to assure a minimum quality of the correlation calculations, since they get more accurate with more input due to their adaptive nature. Filtering takes place in two stages. The first stage tracks the frequency of any unique item. If the frequency is too low, the item and user rating are not considered. The second stage monitors frequencies of unique pairs. If a pair's frequency is too low, the pair is not longer considered.

Pair matrices store the user ratings in an n×n matrix, where n is the number of distinct levels on the rating scale used by users. As previously described, in the current embodiment of the invention, there are seven discrete ratings: −3, −2, −1, 0, 1, 2 and 3. Thus, each pair matrix is a 7×7 matrix. The foregoing description is not intended to be limiting. Other rating scales, resulting in matrices of other dimensions are also suitable. Provided below is an algorithm for storing ratings to the pair matrices 102:

1. Get a pair of ratings for a pair of items.
2. Find the matrix for that pair, and create if it does not exist yet.
3) Using the rating pair as index into the matrix, locate the cell for that rating pair.
4) Increment the cell's value by one.
5) Go to 1.

Using commonly known analytical methods, a correlation factor is calculated from the pair matrix for each program pair. Every matrix yields a correlation factor from approximately −1 to 1.

The correlation filter 103 prevents pairs of items from being considered that have correlation factors close to 0. Thus, pairs that only correlate weakly are not used. Those pairs that pass the correlation filter 103 are assembled into a correlating items table 104a, which lists all other significantly correlating items for every item. That list, or a part thereof, is distributed back to the client 10.

On the client side, a predictive engine assigns a rating to a new unrated item that is predictive of how much that item will appeal to the user, based on the rated items 16 and the correlating items table, that describes the correlations between items. Provided below is an algorithm for rating an unrated item.

1. Get an unrated item (program).
2. Search for the item in the correlating items table. If not found, no prediction is made—Go to 1.
3. Create a work list of correlation factors for all correlating items the user has rated, together with the user ratings.
4. If the work list is empty, no prediction is made. Go to 1.
5. Make sure the work list contains a fixed number of items.
 If the work list exceeds the fixed number, remove those that relate to the worst correlating item (program).
 If the list is too short, pad it with correlation factors of 1 and a neutral rating.
 The fixed length selected is a matter of design choice; the intent is to provide a fixed-length list of input so that results can be compared fairly when predicting for different unrated items, when the amount of data available for prediction varies.
6. The sum of (rating*correlation) of all items in the work list, divided by the sum of the absolute values of correlation factors for all items constitutes a prediction a rating for the item that is predictive of the degree to which the item will appeal to the user.

Enhancements to Ensure Privacy

As described above, the system is designed to safeguard the user's anonymity. There are many clients, and over time more and more programs are rated. When a particular client has rated a few more programs, the server would need to include that input in the Pair Matrices to further increase the accuracy and scope of the correlations. Conventionally, only the new data would be transmitted to the server to permit it to do the work of updating the pair matrices. However, to do that, the server would need to save the state for each client and identify the client in order to know all the items rated by that client. Privacy requirements disallow any method of identifying the client when accepting input. Therefore, the rated items list is sent in its entirety, on a periodic basis. Clients use the same time window for sending in their lists, at randomly chosen times. The server accepts input as described earlier, keeping counts in the matrices. In addition, the server compensates for the repetitive input by normalizing the counts. Normalization involves dividing all counts by a factor that keeps the counts constant, as if all clients kept an unchanging list of rated items. In this way, as the clients slowly grow and alter their lists, the counts on the server will slowly adapt to the new state, and correlation factors will stay up to date, even as the general opinion among users changes. Such a gradual shift in opinion among television viewers occurs inevitable as television series gradually change, one program becoming more like some programs and becoming less like others. In effect, it allows the tracking of correlation over time, without tracking the actual changes to a particular client's ratings.

Adaptive Filtering Algorithm

As indicated previously, items may be rated by one of two algorithms, either the collaborative filtering algorithm described above, or an adaptive filtering algorithm incorporating a naïve Bayes classifier, described in greater detail herein below. It is has been empirically determined that collaborative filtering is a more reliable predictor of items that are likely to appeal to the user than the adaptive filtering algorithm. Accordingly, it is preferable that the collaborative filter rates an item. However, in the absence of collaborative filtering data, a heuristic passes invokes the adaptive filtering algorithm. Collaborative filtering data may not be present if the client has been unable to contact the server. The adaptive modeling algorithm works by using content-based filtering. In particular, it uses a program's features and the user's previously expressed preferences on individual program features to arrive at a prediction of how much the user would like the program. As previously noted, programs may be described in terms of attributes: actor, genre and director, for example. Generally, each attribute may have several values. For instance, 'genre' may have any of several hundred values; 'actor' may have any of several thousand values. Each individual value, or attribute-value pair, may be seen as a distinct program feature. Thus, genre: 'situation comedy' is a feature; actor: 'Jennifer Anniston' is another feature. During the teaching phase, the user may have rated 'Jennifer Anniston' 1 thumb up and 'situation comedies' 2 thumbs up. Based on the user's expressed preferences, and program information from the TRIBUNE MEDIA SERVICES (TMS) database, which indicates that the genre feature for "Friends" is 'situation comedy' and the actor feature is 'Jennifer Anniston,' the system would assign 1 thumb up to "Friends."

In the example above, it is worth noting that, in the presence of an actor having a 1 thumb up rating and a genre having a 2 thumbs up rating, the system assigned the program 1 thumb up, rather than 2, indicating that the actor rating was weighted more heavily than the genre rating in predicting the program rating. A feature's specificity is an important determinant of the weight given to it in computing a program rating. It is apparent, that, in considering a population of features for a pool of programs, a specific actor occurs less frequently in the population than a genre. Thus, in the example, the actor 'Jennifer Aston' would occur less frequently than genre 'situation comedy.' Thus, if a feature is rare in a population of features, and occurs in a description of a program, because of its rarity in the general population, it is probable that it is highly relevant to the program description. Accordingly, the less likely that a feature occurs in a general population of features, the more heavily weighted the feature will be in predicting a rating for the program having the feature. Thus, a specific actor may occur across several different genres, and genre will be weighted less heavily than actor for prediction of program ratings.

Significantly, the foregoing discussion has been directed to explicit feature ratings given by the user. It is preferable that new programs be rated according to explicitly stated user preferences. When the adaptive modeling algorithm initializes, the program features are evaluated. If the user has explicitly rated even one of the program features, the explicit user ratings are utilized to compute a rating for the program. In the absence, however of explicit feature ratings, the adaptive modeling algorithm employs a naïve Bayes classifier to infer feature ratings, and compute a program rating based on the inferred ratings. It is fundamental to the invention that user ratings always take precedence over inferred ratings. Thus, if the user has rated even one feature of a program, the naïve Bayes classifier is not invoked and the one rated feature is employed to compute the rating for that program. Inference happens as follows: if the user assigns an overall rating to a program, for example, "Cheers," the system evaluates the separate features of "Cheers" and assigns ratings to the feature based on the user's overall rating of the program. The inferred feature ratings are then used to compute a rating for a new, unrated program. The process of generating inferred ratings is described in greater detail below.

The system keeps a tally of how often a feature of an item occurs in a population of rated items, and the rating given to the item by the user. For example, a user may rate a program starring Jennifer Anniston two thumbs up. Another program with another actor may be rated one thumb up. The system keeps a tally of the number of times a feature occurs in the population of rated programs, and what rating the program received, and makes an intelligent conclusion about the significance of a feature to the user, based on the feature occurrences and the ratings. Thus, if in the population of rated programs, Jennifer Anniston occurred ten times, each time in a program receiving two thumbs up, then the probability would be high that any other program she occurred in would receive two thumbs up.

A stepwise description of a naïve Bayes classifier, according to the invention follows:

As indicated above, a pool of items (programs) exists. The user of the system assigns ratings to a subset of that pool using a discrete number of levels. In the preferred embodiment, the rating is expressed as a number of thumbs up or down, corresponding to ratings of −3 to 3; to avoid ambiguity, the rating '0' is omitted from calculations. The items are described in terms of predefined attributes. For example: the main actor, the genre, the year the program was released, the duration, the language, the time it is aired, the tv channel it is broadcast on, how much of it has been viewed, and so on. Each attribute may have a plurality of values. For each value of each attribute, a vector $C_x$ is defined ($C_0$ is the first attribute, $C_1$ the second, $C_2$ the third . . . etc.). The length of each vector is set as the number of discrete rating levels; in the preferred embodiment, six. The vectors are used to keep track of the frequency of that feature (attribute-value pair) and the rating for each occurrence. A special global vector is kept to track the overall number of items that receive a particular rating, regardless of the features in that item. Where P is a prediction vector, $C_1 \ldots C_n$ is the feature vector for feature n, G is the global vector and there are m rating levels, P is calculated according to:

$$P(0) = \frac{C_1(0) * C_2(0) * C_3(0) \ldots C_n(0)}{G(0)} \quad (1)$$

$$P(1) = \frac{C_1(1) * C_2(1) * C_3(1) \ldots C_n(1)}{G(1)}$$

$$P(2) = \frac{C_1(2) * C_2(2) * C_3(2) \ldots C_n(2)}{G(2)}$$

$$\vdots$$

$$P(m-1) = \frac{C_1(m-1) * C_2(m-1) * C_3(m-1) \ldots C_n(m-1)}{G(m-1)}$$

The rating where P shows a maximum value is the most probable rating for the feature. The distribution of the values in P is an indicator of certainty.

In classical implementations of the naïve Bayes classifier, it is assumed that for every attribute, only one value may occur at a time, like the color for a car. However for a program, multiple values may occur simultaneously. For example: for the attributes actors, directors, writers and genres, there are multiple simultaneous values, and sometimes none at all. For the purpose of predicting program ratings, the values lists for the various attributes are collapsed into aggregate genre and cast vectors for those features that occur in the program to be rated. Thus, for the purpose of predicting program ratings, two attributes are created, cast and genre.

The two attributes are different in nature, and the method of collapsing, or combining all values for an attribute is different. For the genre attribute, vectors are summed, the population of genres consisting of only a few hundred separate values. Due to the large population of actors, directors and writers, possibly numbering in the ten's of thousands, they are combined by taking the maximum frequency at each rating level. Additionally, actors are often clustered.

With the number of attributes being reduced to two, the possibility exists that either attribute can have 0 occurrences of matching preferences. Thus the input to the formula may be 0, 1 or 2 attributes. If there is only data for one attribute, the global vector is ignored, and only the product term is considered.

As mentioned above, a measure of confidence may be derived by considering the distribution of values in P. However, in the early stages of using the system, the number of items that have been rated is small, which produces extremes in the distribution of values, and would lead to unreliable confidence ratings. Instead, the confidence rating may be based on the amount of evidence for the winning rating level. If the maximum rating level is x, then all counts for every category (x) for all genres and all actors are summed. This value is called P(x)e, the total amount of evidence for P(x). A global vector, H, is kept to track the highest count for each winning rating level that has been found during system operation. C(x)e is normalized against H(x) so that the confidence is only high when it is a record or near record for that bin. This system still favors 1 in the early use of the system. To give it a more sensible start, without affecting long-term behavior, a LaPlace method is used that avoids anomalies where there is very little data. Instead of confidence=P(x)e/H(x), confidence=(P(x)e+1)/(H(x)+2) is used. This makes it start at 0.5 initially, and the restriction on confidence relaxes as evidence grows.

To summarize the foregoing: the collaborative filtering algorithm is the preferred method of predicting program ratings. In the absence of up-to-date correlation factors provided by the server, a content-based adaptive filtering algorithm predicts program ratings. The features of a program to be rated are evaluated. If the user has explicitly rated any of the program's features, the user ratings are employed to predict a rating for the program. In predicting a rating, features of high specificity are more heavily weighted than those of low specificity. In the event that the user hasn't rated any of program's features, a modified naïve Bayes classifier calculates the of probability of the program being assigned a particular rating, using inferred feature ratings derived from previous user ratings of programs. A probability vector allows a confidence level to be expressed for the predicted rating.

Display of Rated Items

As FIG. 2 shows, rated items are displayed as a list of suggestions. Both user rated-items and items carrying predicted ratings are listed in the same display. As previously described, user ratings are differentiated from predicted ratings through the use of distinct ratings icons. The output from both prediction engines, the collaborative filtering engine and the content-based engine is scaled and integrated into the same list. As previously described, the ratings range from three thumbs up to three thumbs down, with three thumbs up being most favorable, and three thumbs down being most unfavorable, corresponding to discrete numerical ratings in a range of −3 to 3. For display, the items are sorted in descending order from most favorable to least favorable. Within each discrete rating, the items are sorted in descending order according to confidence of the prediction, the confidence level ranging from 1 to −1. Confidence level values are not necessarily discrete values, as the ratings are. It will be apparent that explicit user ratings have the highest confidence level, thus they are listed first within the ratings groups.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

What is claimed is:

1. A non-transitory computer-readable medium storing instructions, the instructions including instructions which, when executed by one or more processors, cause the one or more processors to perform the steps of:

accepting ratings, at a multimedia recording device, of media content items from a user, via a graphical user interface, according to a rating system;

expressing the rating system using a graphical metaphor;

receiving by the multimedia recording device, from a server, correlation data between pairs of available media content;

generating ratings at the multimedia recording device of media content items not rated by the user according to one or more predictive algorithms, based on the media content items specifically rated by the user and the correlation data received from the server;

displaying, by the multimedia recording device, the media content items ratings by the user and the generated media content ratings in the graphical user interface; and allowing the user to correct generated media content ratings displayed in the graphical user interface.

2. The non-transitory computer-readable medium of claim 1, wherein items are defined by predetermined attributes, each attribute having a plurality of possible values, and wherein the rating step further comprises:
    displaying interactive lists of items; and
    displaying interactive lists of attributes and corresponding values, wherein each unique attribute-value pair constitutes a feature.

3. The non-transitory computer-readable medium of claim 1, wherein the step of rating items according to the rating system by the user comprises at least one of the steps of:
    assigning an overall rating to an item; and
    assigning ratings to individual features.

4. The non-transitory computer-readable medium of claim 1, wherein the rating system includes values from a range of approximately −3 to 3, wherein a negative number signifies an unfavorable rating, a positive number signifies a favorable rating and a '0' signifies a neutral rating.

5. The non-transitory computer-readable medium of claim 1, wherein the graphical metaphor utilizes "thumbs up" icons for favorable ratings and "thumbs down" icons for unfavorable ratings, and wherein a number of thumbs assigned to an item equals a numerical value of the rating.

6. The non-transitory computer-readable medium of claim 1, wherein the step of generating ratings comprises:
    identifying new items that correlate highly with items previously rated by the user, according to a collaborative filtering algorithm; and
    assigning ratings to the new items based on the correlation and the previous user rating.

7. The non-transitory computer-readable medium of claim 1, wherein the step of generating ratings comprises:
    implementing a content-based adaptive modeling algorithm;
    evaluating user-assigned ratings of individual features; and
    assigning an overall rating to a new item defined by at least one the user-rated features based on the user-assigned ratings.

8. The non-transitory computer-readable medium of claim 7, wherein the step of generating ratings comprises:
    pooling features defining items assigned overall ratings by the user, except for features that have explicitly been rated by the user;
    tallying occurrence of each distinct feature in the pool, and weighting each distinct feature according to the overall ratings of items it defines, according to a rating inference calculation; and
    generating overall ratings for new items based on the tallies and weightings of the features.

9. The non-transitory computer-readable medium of claim 1, wherein the media content comprises at least one of: network television programming, cable television programming, pay-per-view television programming, movies and public-access television programming.

10. The non-transitory computer-readable medium of claim 2, wherein the attributes include at least one of:
    genre, actor, and director.

11. The non-transitory computer-readable medium of claim 5, wherein the "thumbs up" and "thumbs down" icons for user assigned ratings are visually distinct from icons for generated ratings.

12. The non-transitory computer-readable medium of claim 1, wherein confidence level of the predictive algorithms increases as a number of explicit ratings increases.

13. The non-transitory computer-readable medium of claim 1, wherein the step of displaying the ratings comprises:
    aggregating the user-rated items and outputs of the predictive algorithms into a single list;
    sorting the list according to rating in descending order;
    sorting items having the same rating according to confidence level in descending order; and
    displaying the sorted list in the graphical user interface as a list, wherein an item is displayed accompanied by its rating icon.

14. The non-transitory computer-readable medium of claim 5, further comprising:
    changing a rating by the user; and
    updating a rating icon to correspond to the changed rating.

15. The non-transitory computer-readable medium of claim 14, wherein a user-assigned rating cannot be replaced by a generated rating.

16. A non-transitory computer-readable medium storing instructions, the instructions including instructions which, when executed by one or more processors, cause the one or more processors to perform the steps of:
    rating a new item based on earlier ratings of items by the user that correlate highly with the new item according to a first predictive algorithm when the new item has earlier ratings of items by the user that correlate highly with the new item, the first predictive algorithm comprising a collaborative filtering algorithm;
    rating the new item, when the new item has not been rated by the first predictive algorithm, according to a second predictive algorithm, the second algorithm comprising a content-based adaptive modeling algorithm, based on ratings of specific features by the user describing the item, wherein at least a portion of the features have previously been explicitly rated by the user;
    for a new item whose features have not been previously rated by the user, rating the new item based on previous explicit ratings of items by the user, according to the adaptive modeling algorithm, wherein the adaptive modeling algorithm generates implicit ratings of features based on the explicit ratings of items by the user; and
    allowing the user to correct a rating for an item generated by the first predictive algorithm or the second predictive algorithm.

17. The non-transitory computer-readable medium of claim 16, wherein the collaborative filtering algorithm rates items according to correlation factors, so that an item with a high correlation factor to an item rated by the user is similarly rated.

18. The non-transitory computer-readable medium of claim 17, wherein the correlation factors are provided in a table of correlating items.

19. The non-transitory computer-readable medium of claim 18, wherein the table of correlating items comprises a plurality of pairs of items and a corresponding correlation factor for each pair.

20. The non-transitory computer-readable medium of claim 17, wherein the correlation factors are calculated from other users' ratings, wherein the other users' ratings are stored in one or more pair matrices, and wherein each matrix yields a correlation factor in a range of approximately −1 to 1.

21. The non-transitory computer-readable medium of claim 18, wherein the table of correlating items is downloaded to a client from a server.

22. The non-transitory computer-readable medium of claim 16, further comprising:
    presenting the user with a list of possible features;

assigning ratings to at least a portion of the displayed features by the user; and inputting the ratings of the values to the second predictive algorithm, wherein features of high-specificity that occur infrequently are heavily weighted and considered to be reliable predictors.

23. The non-transitory computer-readable medium of claim 22, wherein the step of presenting the user with a list of possible features comprises:

wherein descriptive attributes are displayed as user selections on a screen, wherein selecting an attribute navigates the user to a subsequent screen displaying one or more lists of values, each unique attribute-value pair constituting a feature.

24. The non-transitory computer-readable medium of claim 23, wherein the step of assigning ratings to at least a portion of the features by the user comprises:

selecting a list of features, wherein features constituting the list are displayed on a subsequent screen; and assigning ratings to at least a portion of the displayed features.

25. The non-transitory computer-readable medium of claim 16, wherein the step of rating new items based on previous explicit user ratings of items comprises:

determining features that correlate to the user's tastes and preferences, based on previous ratings of items by the user;

optionally, presenting the user with a list of said features allowing the user to interactively modify the list; and inputting the features to the second predictive algorithm, wherein the second predictive algorithm rates items not previously rated.

26. The non-transitory computer-readable medium of claim 25, wherein the second predictive algorithm includes a modified naïve Bayes classifier, wherein the modified Bayes classifier accommodates multiple simultaneous features, and wherein the modified Bayes classifier is capable of excluding selected features.

27. The non-transitory computer-readable medium of claim 26, wherein user ratings comprise explicit ratings and generated ratings comprise implicit ratings, and wherein an explicit rating overrides an implicit rating.

28. The non-transitory computer-readable medium of claim 27, wherein explicitly rated features are excluded as inputs to the Bayes classifier whereby the algorithm works only with unrated features, the unrated features comprising free-floating features.

29. The non-transitory computer-readable medium of claim 28, wherein the step of determining features comprises:

aggregating all free-floating features from the user-rated items into a population of features;

tallying occurrences of unique features in the population;

assigning a weight to each unique feature, wherein a feature of high-specificity has a higher weight than one of low specificity; and wherein an infrequently-occurring, highly-weighted feature constitutes a reliable predictor of items likely to appeal to the user.

30. The non-transitory computer-readable medium of claim 25, wherein the step of presenting the user with a list of the features allowing the user to interactively modify the list further comprises:

selecting a list of features, wherein features constituting the list are displayed on a subsequent screen; and allowing the user to modify the ratings.

31. The non-transitory computer-readable medium of claim 16, wherein the media content comprises at least one network television programming, cable television programming, pay-per-view television programming, movies and public-access television programming.

32. The non-transitory computer-readable medium of claim 23, wherein the attributes include at least one of: director, actor and genre.

33. The non-transitory computer-readable medium of claim 16, wherein the ratings include values from a range of approximately −3 to 3, wherein a negative number signifies an unfavorable rating, a positive number signifies a favorable rating and a '0' signifies a neutral rating.

34. The non-transitory computer-readable medium of claim 33, wherein a graphical metaphor expresses the ratings, wherein a "thumbs up" icon signifies a favorable rating and a "thumbs down" icon signifies an unfavorable rating, and wherein a number of thumbs assigned is equal to an absolute value of the rating.

35. The non-transitory computer-readable medium of claim 34, wherein icons signifying explicit ratings are distinct from icons signifying implicit ratings.

36. The non-transitory computer-readable medium of claim 16, wherein confidence level of the predictive algorithms increases as the number of explicit user ratings increases.

37. The non-transitory computer-readable medium of claim 16, further comprising:

aggregating user-rated items and generated item ratings from the first predictive algorithm and the second predictive algorithm into a single list; and displaying the list to the user.

38. A non-transitory computer-readable medium storing instructions, the instructions including instructions which, when executed by one or more processors, cause the one or more processors to perform the steps of:

predicting a rating of an item based on features explicitly rated by a user;

in the absence of explicitly rated features, predicting a rating of an item based on implicitly rated features, wherein an adaptive modeling algorithm generates the implicit feature ratings based on previous overall ratings of items made by the user; and allowing the user to correct a predicted rating for an item in order to obtain predicted item ratings.

39. The non-transitory computer-readable medium of claim 38, wherein the step of predicting a rating of an item based on features explicitly rated by the user comprises:

inputting features defining the item to the adaptive modeling algorithm; and rating the item according to the features, wherein features of high specificity are heavily weighted, and wherein an infrequently-occurring feature of high specificity constitutes a reliable predictor for the item.

40. The non-transitory computer-readable medium of claim 38, wherein the step of predicting a rating based on implicitly rated features comprises:

determining features that correlate to the user's tastes and preferences, based on previous ratings of items by the user;

optionally, presenting the user with a list of the features allowing the user to interactively modify the list; and inputting the features to the adaptive modeling algorithm, wherein the adaptive modeling algorithm rates items not previously rated.

41. The non-transitory computer-readable medium of claim 40, wherein the adaptive modeling algorithm includes a modified naïve Bayes classifier, wherein the modified Bayes classifier accommodates multiple simultaneous features, and wherein the modified Bayes classifier is capable of excluding selected features.

42. The non-transitory computer-readable medium of claim 38, wherein an explicit rating overrides an implicit rating.

43. The non-transitory computer-readable medium of claim 41 wherein explicitly rated features are excluded as inputs to the Bayes classifier whereby the adaptive modeling algorithm works only with unrated features, the unrated features constituting free-floating features.

44. The non-transitory computer-readable medium of claim 43, wherein the step of determining features comprises:
aggregating all free-floating features from the user-rated items into a population of features;
tallying occurrences of unique features in the population;
assigning a weight to each unique feature, wherein a feature of high-specificity has a higher weight than one of low specificity; and
wherein an infrequently-occurring, highly-weighted feature constitutes a reliable predictor of items likely to appeal to the user.

45. The non-transitory computer-readable medium of claim 40, wherein the step of presenting the user with a list of the features allowing the user to interactively modify the list further comprises:
selecting a list of features, wherein features constituting the list are displayed on a subsequent screen; and
allowing the user to modify the ratings.

46. The non-transitory computer-readable medium of claim 38, wherein the media content comprises at least one of network television programming, cable television programming, pay-per-view television programming, movies and public-access television programming.

47. The non-transitory computer-readable medium of claim 38, wherein the ratings include values from a range of approximately −3 to 3, wherein a negative number signifies an unfavorable rating, a positive number signifies a favorable rating and a '0' signifies a neutral rating.

48. The non-transitory computer-readable medium of claim 38, wherein confidence level of the adaptive modeling algorithm increases with increasing numbers of explicitly rated items.

49. The non-transitory computer-readable medium of claim 47, wherein a graphical metaphor expresses the ratings, wherein a "thumbs up" icon signifies a favorable rating and a "thumbs down" icon signifies an unfavorable rating, and wherein the number of thumbs assigned is equal to the absolute value of the rating.

50. The non-transitory computer-readable medium of claim 49, wherein icons signifying explicit ratings are distinct from icons signifying implicit ratings.

51. The non-transitory computer-readable medium of claim 49, further comprising:
aggregating user-rated items and output of the adaptive modeling algorithm into a single list; and
displaying the list to the user.

* * * * *